Nov. 20, 1945.   H. B. KITTLESON   2,389,369
COMPUTOR SCALE
Filed March 12, 1943
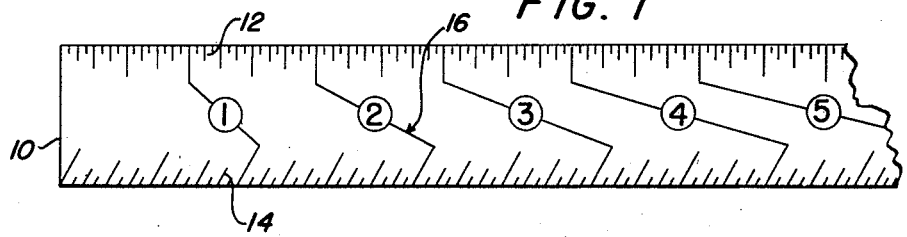
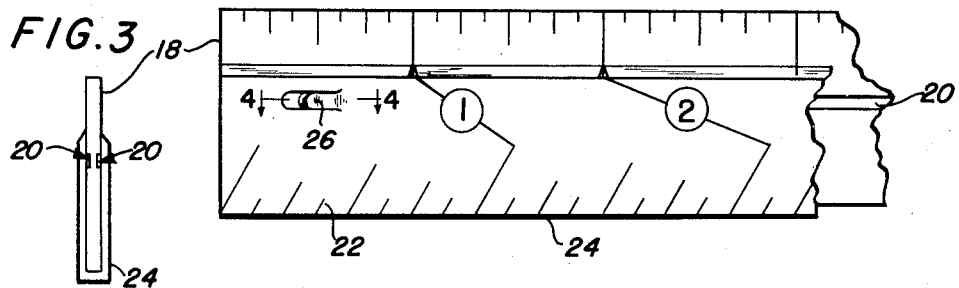
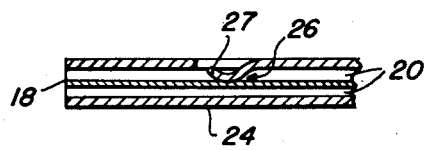
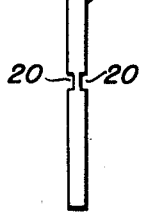
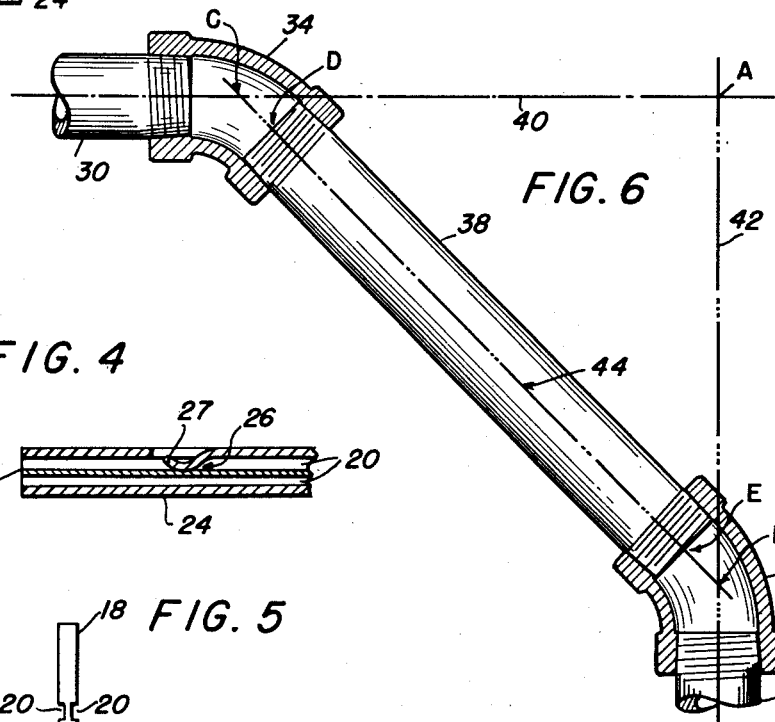
HOWARD B. KITTLESON INVENTOR
BY Herbert E. Smith
ATTORNEY Patented Nov. 20, 1945

2,389,369

UNITED STATES PATENT OFFICE 2,389,369

COMPUTER SCALE

Howard B. Kittleson, Salt Lake City, Utah

Application March 12, 1943, Serial No. 478,914

2 Claims. (Cl. 33—111)

My invention relates to improvements in computer scales and, more particularly, to scaled instruments useful to mechanics such as those in the building trades who frequently must determine dimensions in relation to the legs of a right triangle in the fabrication and assembly of structural elements.

In cutting and assembling a piping system from lengths and sizes of pipe and fittings, it is often necessary to solve problems of a geometric nature. Such a problem arises particularly in the forming of offsets, corners, bends and the like in a piping system in which it is highly desirable to avoid sharp turns in the elimination of internal friction to the passage of liquids or gases. I have in mind the problem that occurs where a plumber or steamfitter must change the direction of a pipe course and desires to include an angularly disposed coupler section between two main sections that lie substantially at right angles to each other. The factors involved in such a problem include the taking into consideration of the distance that pipe parts reside from adjacent fixed walls, posts or other structural members; the distance back from the otherwise actual junction of the two main pipes that the coupler member is to be introduced into the system; allowances that must be made for the couplings ordinarily employed; and other factors of a similar nature.

More specifically, the problem arises in the running of a pipe line with an obliquely disposed change-direction section rather than a sharp corner comprises the calculation of the length of the hypotenuse of a triangle formed in connection with the projection of the axes of two angularly disposed main pipe sections which are to be cut short of the projected point of intersection of the two axes. In certain cases both distances from the end of each pipe to the probable point of intersection may be known and in certain cases only one such dimension may be available. In the latter case the oblique angle must be known while in the former case the solution of the problem furnishes the angle automatically if that need be known.

It is, therefore, an important object of my invention to provide a scale to which may be applied certain known factors of measure from which relative factors may be read or taken in the rapid solution of problems of a geometric nature.

A further object of the invention is the provision, in a scale of the kind mentioned, of offset factors giving the length or angularity of the hypotenuse of a triangle when the length of one leg only is known.

Another object of the invention is to provide, in a computing scale, interchangeable factors to accommodate the scale to various types of problems that are to be solved.

Still another and further object of the invention is to provide a ruler having a scale of standard measurements and a scale of offset relative measurements which are so associated together that the application of a known factor to the standard scale leads simply and quickly to the determination and reading of the relative offset.

One other object of the invention is the provision, for attachment to a standard ruler, of various types of offset scales to be read relative to the standard scale and which may be quickly interchanged or adjusted for use in a simple and efficient manner.

Other objects and advantages of the invention will be more apparent from a study of the drawing forming a part of this disclosure of a preferred and perfected form of my invention which is more fully described in the following specification.

In the drawing, in which like reference characters apply to like parts throughout the same, Figure 1 is a plan view of a portion of a ruler having standard scale markings along one portion and offset scale markings associated parallel therewith and the two being joined by suitable reference lines for ease in transposing factors from a point on one scale to the co-relative factor of the other scale, Figure 2 is a view of a modified form of ruler embodying my invention, Figure 3 is an end elevational view of the device of Figure 2, Figure 4 is a sectional view taken on line 4—4 of Figure 2, Figure 5 is a plan view of a friction device used between the separable elements of the scale of Figure 2, and Figure 6 is a diagrammatic illustration of a typical problem to which my invention has particular application.

Referring to Figure 1, the numeral 10 designates a ruler of the type that is customarily used by mechanics. This rule has along one edge a standard scale 12 which may be divided into inches and graduations thereof to $\frac{1}{16}$ of an inch. Upon the opposite edge of this rule, at an angle thereto, are the graduations of an offset scale 14 corresponding in number and arrangement to the graduations of the scale 12. It is to be noted that the offset graduations 14 are expanded somewhat with relation to the scale 12 and that they are slanted and thus readily distinguishable from the standard scale in which the graduation marks are at right angles to the length of the scale. In this particular instance the spacing and markings of the offset scale 14 are divided in proportion to the same of the standard scale 12 to indicate the length of the hypotenuse of a triangle having an included angle of forty-five degrees to either one of the legs and in which the length of the leg adjacent the included angle is known, or can be calculated on scale 12. Between the major factors (the inch marks) of scale 12 and the corresponding relative factors of scale 14 are reference tie-lines 16, which aid in a transposition from one factor previously determined to a factor to be determined by the use of my computing scale.

As is common with most rules and scales used for similar work, the primary or inch marks are strongly identified on the standard scale and are usually indicated by numerals designating progressively a series of measurements. The intermediate graduations are formed in the customary manner, with the half inch, quarter inch, eighth inch and sixteenth inch marks, being of various lengths for ease of reading. In a like manner the graduations of the offset scale vary in length, such as the ruler with which they are associated, and it is also to be noted that they are set at an oblique angle with relation to that edge so that a mechanic using my computing scale will not be confused as to which side is the standard measurement and which side is the scale relating to factors to be determined.

The scale shown in Figure 2 relates to right triangles in which the hypotenuse meets the leg at an angle of forty-five degrees. In which case the mechanic would be dealing with a forty-five degree offset. Alternative scales, 5⅝ degree, 11¼ degree, 22½ degree, 30 degree, 60 degree and other offsets will be of a similar nature, the only variation being in the relation of the graduation between the standard and the offset scale.

Referring to Figure 2, the scale shown is in every respect similar to that of Figure 1, an exception being that the offset graduations are provided on a member that is removable from the main member and interchangeable with similar members that may have different graduations to accommodate varying angles. In this case the body of ruler 18 is provided with a longitudinal groove 20 intermediate its edges, and on at least one side thereof. I have shown opposed grooves 20, 20.

The graduated scales 22 are formed on one face of a U-shaped member 24 which has a resilient presser member 26 that slidably engages in grooves 20 when the ruler 18 is fitted between the legs of the U-shaped member 24. It is preferable that the detent 26 be so distorted inwardly that it will press against the bottom of groove 20 and serve to retain the parts 18 and 24 together against dislodging shocks and rough handling.

I have shown member 26 as being struck from one of the legs of member 24 and having an "ogee" shape, so that at least a portion 27 is offset interiorly of the leg to which it is attached. Since member 26 is resilient, it serves as a friction device or a brake.

Assuming that we are dealing with two runs that lie at right angles to each other and into which adjacent their juncture we wish to insert an obliquely disposed section; we have a problem which is specifically shown in Figure 6. The main pipe sections 30 and 32 each has at its end the oblique couplings 34 and 36 respectively. Between the couplings 34 and 36 we are to insert a piece of pipe 38. In effect, pipe 38 is the hypotenuse of a triangle between the axes of couplings 34 and 36 and the projective axis of pipes 30 and 32, each indicated by the numerals 40 and 42 respectively. These axes intersect at A.

The distance AB or AC which is respectively the length of the projected axis 40 and 42 from the point at which the axis 44 of pipe 38 intersects within fittings 34 or 36 can readily be determined by measurement. These points are marked B and C. The length of pipe 38 cannot so easily be determined without recourse to a rather involved mathematical procedure since it is not actually the length of BC. Since it is well known that every pipe threaded into a fitting enters that fitting a certain distance, we have an additional factor to be taken in consideration in calculating the actual length of pipe 38, namely how much shorter is the pipe 38 than the actual distance BC. Since this factor is fairly standard with each type of fitting in its various sizes, that distance which is here designated as CD and BE and can be accommodated for in my scale in the calculation of the length of DE by applying dimensions AB or AC to the graduation 12 relative to the corresponding graduations of scale 14.

It is well known that an equilateral right triangle having a leg of a certain dimension will have a hypotenuse that is directly proportionate to that leg and that, irrespective of the length of the leg, the hypotenuse in any given triangle will be in accordance with that proportion. I therefore calculate the graduation of my scale 14 with respect to that proportion and make allowance for the distances CD and BE so that, should a mechanic measure either the dimension AC or AB of Figure 6, transpose that measurement to scale 14 from scale 12, and in so doing employ the reference line 16, he will readily and simply read on scale 14 the length to which he must cut pipe 38.

While I have described throughout this specification the use of my computing scale with relation to a layout of and the prefabrication of certain piping elements, it will be readily recognized that the invention is useful in carpentry and in other of the arts. Therefore I do not wish to be unduly limited by reason of the exemplifying description which I employ in teaching the principles of my invention. It is obvious that the computing scale which I here disclose will be useful to architects and estimators, layout men of all natures, that its use is simple and that it may be employed by those who are not fully trained in mathematics or highly skilled in their particular arts.

Although I have shown and described certain special and specific embodiments of my invention, I am fully aware that there are many modifications possible. My invention, therefore, is not to be restricted except insofar as is necessitated by the prior art and by the spirit of the appended claims.

I claim:

1. A computer scale comprising strip means including: an elongated base member having greater width than thickness and a longitudinal groove along one of the faces thereof, a graduated scale along one edge of the base member to one side of the longitudinal groove, said strip means also including a U-shaped member removably mounted on said base member to enclose that edge of the base that lies opposed to said scale, resilient means on the U-shaped member engageable in said groove, a graduated scale on a face of the U-shaped member and having sub-divisions of the same order but incommensurable with relation to the first scale, and a lead line carried by said U-shaped member extending from a certain major point in the scale thereon to a point registrable with a corelative major point in the scale on the base member.

2. A computer scale comprising strip means including: an elongated base member having greater width than thickness, a graduated scale along one edge of said base member, said strip means also including a U-shaped member to enclose said base member aside from the portion whereon is displayed said graduated scale, a graduated scale inscribed upon said U-shaped member and having sub-divisions of the same order but incommensurable with relation to said first scale, and a lead line on the U-shaped member from at least one major point in the scale thereon to a point registrable with a correlative major point in the scale on the base member.

HOWARD B. KITTLESON.